United States Patent
Tanaka

[15] 3,639,894
[45] Feb. 1, 1972

[54] APPARATUS FOR DETECTING TRAFFIC INFORMATION

[72] Inventor: Ryohei Tanaka, Kyoto, Japan
[73] Assignee: Omron Tateisi Electronics Co., Kyoto, Japan
[22] Filed: Feb. 11, 1970
[21] Appl. No.: 10,404

[30] Foreign Application Priority Data
Feb. 19, 1969 Japan....................................44/12386

[52] U.S. Cl............................................340/31 A, 340/38 L
[51] Int. Cl. .........................................................G08g 1/08
[58] Field of Search...............................340/31 R, 38 R, 38 L Primary Examiner—William C. Cooper
Attorney—Christensen, Sanborn & Matthews

[57] ABSTRACT

An apparatus for detecting traffic information on a street, which includes a vehicle detector provided with a plurality of vehicle-detecting elements having their respective predetermined detection areas on the street. One of the detecting elements is always operatively connected to the detector to provide for the detector a detection area extending a minimum distance or length along the street in the direction in which vehicles run, for measurement of traffic information under the normal traffic condition; while the other detecting elements are selectively and additionally connected to the detector to increase the distance of the detection area of the detector for measurement under stagnated traffic conditions.

12 Claims, 3 Drawing Figures

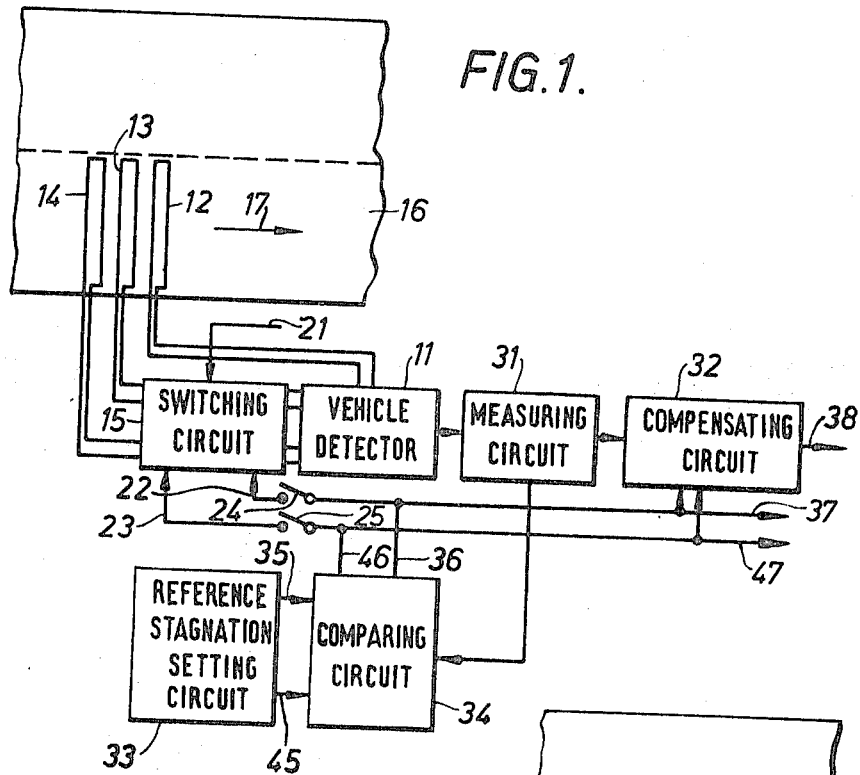
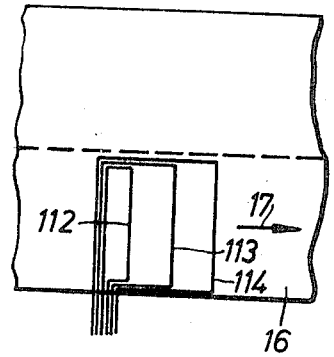
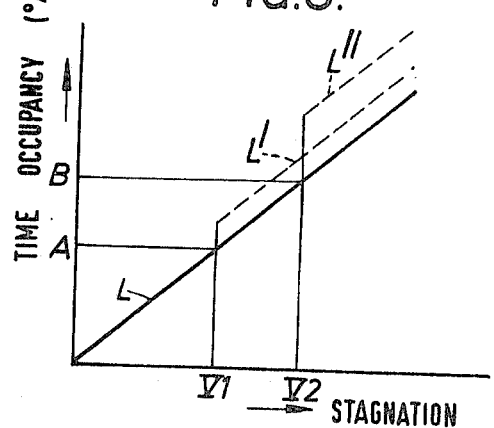

APPARATUS FOR DETECTING TRAFFIC INFORMATION

This invention relates to an apparatus for detecting traffic information on a street, which employs a vehicle detector.

For proper and efficient control of traffic on a street it is necessary to have as accurate traffic information as possible. Traffic information is usually given in various forms, such as traffic volume, vehicle speed, headway, time occupancy, etc. In measurement of traffic volume, vehicle speed or headway, it is preferably that the vehicle detector should have a detection area the extension or length of which in the direction of running vehicles is as short as possible in order to improve the "resolving power" of the detector, that is, its ability to distinguish between two successive vehicles. In the following pages, the above-mentioned extension or length of the detection area of the vehicle detector or its detecting elements will sometimes be referred to simply as the "detection length."

Suppose that a vehicle detector has a detection length $l$. If two vehicles with a distance therebetween shorter than the detection length $l$ pass the detection area successively, the two vehicles can simultaneously exist within the detection area at a certain time. Then, the detector detects the two vehicles at the same time, so that the detector behaves as if there were only a single vehicle being detected, with resulting impossibility of accurate measurement of traffic volume, or headway between two successive vehicles. In this respect, therefore, the detection length of a vehicle detector must be as short as possible.

For accurate measurement of time occupancy, it is also necessary for the detector to have as short a detection length as possible. Time occupancy is measured by measuring the time a vehicle exists within the detection area, and the longer is the detection length of the detector, the longer will be the time required for the same vehicle to pass the detection area, with resulting introduction of errors into the measurement of time occupancy. For measurement of traffic stagnation, however, time occupancy is more effective than the other traffic informations for the following reason. As traffic stagnates, the vehicle speed drops and the traffic volume decreases, and the headway fluctuates as the vehicle speed decreases. Therefore, these informations do not accurately express the actual degree of traffic stagnation.

Suppose that traffic stagnation has so much increased as to cause the vehicles on the street to have almost stopped. If the detecting element of the vehicle detector has a very short detection length $l$, it may well happen that the detecting element is positioned just intermediate the two succeeding vehicles that have been stopped due to the stagnation. Under the condition the detecting element cannot detect any vehicle so that despite the serious traffic stagnation, the time occupancy at that time has a value as if traffic were normally flowing along the street. This means that under the stagnated traffic condition the time occupancy, if measured with a vehicle detector having a short detection length, cannot be relied on as a traffic information to correctly express the actual traffic condition on the street. To avoid such a result, therefore, the detection length of the detector must be as long as possible contrary to the previously mentioned case. In short, for accurate and effective measurement of time occupancy the vehicle detector must meet such two contradictory requirements.

Known vehicle detectors have their working ability restricted to either when traffic is stagnated or alternatively when no substantial stagnation exists. However, this is certainly inconvenient.

Accordingly, it is one object of the invention to provide an apparatus for detecting traffic information, which is capable of accurately detecting traffic information on a street under both normal and stagnated traffic conditions.

Another object of the invention is to provide an apparatus for detecting traffic information on a street, which employs a single vehicle detector and yet is capable of accurately detecting traffic information on the street under both normal and stagnated traffic conditions.

Still another object of the invention is to provide an apparatus for detecting traffic information on a street, which employs a single vehicle detector with means for varying the detection length of the detector in accordance with the degree of traffic stagnation so that very accurate traffic information can be obtained under both normal and stagnated traffic conditions.

A further object of the invention is to provide an apparatus for detecting traffic information on a street, which employs a vehicle detector provided with a plurality of detecting elements having their respective predetermined detection areas, and means for changing the number of detecting elements that are to cooperate at the same time thereby to change the detection length of the detector in accordance with the degree of traffic stagnation, so that very accurate traffic information can always be obtained under both normal and stagnated traffic conditions.

The above and other objects, features and advantages of the invention will become more apparent from the following detailed description of one preferred embodiment thereof with reference to the accompanying drawing, wherein:

FIG. 1 is an electrical block diagram of the apparatus of the invention, with a schematic top plan view of a portion of a street on which the vehicle-detecting elements are laid;

FIG. 2 is a plan view of a portion of a street where the detecting elements arranged in accordance with another embodiment of the invention are laid; and FIG. 3 is a graph showing the relation between time occupancy and the degree of stagnation.

Referring now to the drawing, first to FIG. 1, there is shown a vehicle detector 11 having a plurality, say, three detecting elements or antennae 12, 13 and 14 shown as three loops of the same shape. A switching circuit 15 is interposed between the detector 11 and the elements 13 and 14. Although the detector is of a loop type in the illustrated embodiment, any other type of detector such as, for example, a supersonic wave type may be employed. The detecting elements 12–14 are laid on a lane of a street 16 in a well-known manner, each defining a predetermined detection area on a different place of the street lane. As is well known, when a vehicle enters the detection area, a detection signal is produced. The detection area of each of the three detecting elements extends as short a distance as possible in the direction of an arrow 17 in which vehicles run on the street. In the embodiment of FIG. 1, the three detecting elements have the same detection length which is shorter than the average distance between two successive vehicles that have been stopped due to stagnation, and are arranged side by side in the direction 17 to provide for the detector as a whole a total detection area the length of which can be varied as will be described below in detail.

When only one of the detecting elements is rendered operative, the detection area of the detector 11 as a whole has the shortest length, that is, equal to the detection length of the single operating detecting element. Since this shortest detection length is shorter than the average distance between two successive vehicles that have been stopped due to stagnation, the detection area of the single operating detecting element may well be positioned just between the two successive vehicles, with resulting impossibility of accurate measurement of the stagnated traffic condition. To avoid such a result, the other one or two detecting elements may additionally be put into operative condition. This will increase the detection length of the detector as a whole longer than the distance between the two stopped vehicles, thereby making it possible to detect the vehicles. Thus, the stagnated traffic condition can be accurately detected without fail.

The detecting element 12 is always operatively connected to the detector 11 while the other two elements 13 and 14 are selectively connectable to the detector in addition to the element 12 by means of the switching circuit 15. A manually operable device such as a switch, not shown, is connected through a line 21 to the circuit 15, so that when the device is operated to produce a first operating signal on the line 21 to be applied to the circuit 15, the circuit 15 is operated to connect the detecting element 13 to the detector 11; and when the manually operable device is further operated to produce a second operating signal, the switching circuit 15 is again operated to additionally connect the detecting element 14 to the detector 11. Alternatively, when a first automatic operating signal is applied to the switching circuit 15 through a line 22, the circuit 15 is operated to connect the detecting element 13 to the detector 11 and when a second automatic operating signal is applied to the circuit 15 through a line 23, the circuit 15 is operated to connect the detecting element 14 additionally to the detector 11. In the following description, the line and the signal appearing on the line will sometimes be referred to by the same reference numeral.

The automatic operating signals are produced in accordance with the degree of traffic stagnation on the street in the following automatic manner. Switches 24 and 25 inserted in the lines 22 and 23, respectively, are first closed. The detection signal produced by the detector 11 is applied to a time occupancy measuring circuit 31. As is well known, the circuit 31 measures the rate of the total of the periods of time of duration of all detection signals produced by the detector during a unit period of time to this unit period of time. A compensating circuit 32 is connected to the output of the time-occupancy-measuring circuit 31. However, so long as the detecting element 12 alone is connected to the detector 11, the output from the measuring circuit 31 is simply passed through the compensating circuit 32 to appear at a terminal 38 without receiving any compensation. While the detecting element 12 alone is in operation, time occupancy can be accurately measured under normal traffic condition, that is, the condition that vehicles are running on the street without any substantial stagnation. Under the normal condition, as the number of vehicles running along the street increases, the degree of stagnation increases with a resulting increase in the value of time occupancy, as shown in the graph of FIG. 3, wherein a line L is plotted with time occupancy along the ordinate and the degree of stagnation along the abscissa.

Suppose that the arrangement is such that when the value of time occupancy has reached a level of A percent, the ability of the single detecting element 12 fails so that no accurate measurement of time occupancy can be expected any longer. Then, when A percent has been reached, the first automatic operating signal 22 must be produced to connect the second detecting element 13 to the detector 11 in addition to the element 12. To this end, a reference stagnation setting circuit 33 and a comparing circuit 34 are provided. The former circuit 33 produces on a line 35 a first output signal which is equivalent to the output produced by the time occupancy measuring circuit 31 when the time occupancy has reached A percent. The first output signal 35 from the circuit 33 is applied to the comparing circuit 34, to which the output from the circuit 31 expressing the measured value of time occupancy is also applied. When the traffic stagnation on the street has reached a degree of V1 so that the outputs from the two circuits 31 and 33 become equivalent, the comparing circuit 34 produces an output on a line 36, which signal appears on the line 22 as the first automatic operating signal, whereupon the switching circuit 15 is operated to connect the second detecting element 13 to the detector 11 in addition to the element 12, thereby increasing the detection length of the detector as a whole.

When the detection length has thus been extended, the measuring conditions of the apparatus change so that the result of measurement would be plotted as a dotted line L' in the graph of FIG. 3. To compensate for the change in the measuring conditions, the compensating circuit 32 is connected to the output of the measuring circuit 31. The previously mentioned output signal 36 from the comparing circuit 34 is also applied as an operating signal to the compensating circuit 32, so that the line L' coincides with the line L. The output signal 36 also appears at a terminal 37 connected to a suitable indicator, or recorder, or any other suitable device, not shown. The indication shows that the time occupancy has now reached A percent and the degree of stagnation, V1. Thus, in accordance with the invention, when traffic stagnation has reached a preset degree, a second detecting element is automatically brought into operation to cooperate with the first detecting element, thereby increasing the detection area to a length most suitable for measurement of time occupancy under the present stagnated traffic condition greater than the preset degree of V1.

When the stagnation has reached a degree of V2, the third detecting element 14 is connected to the detector 11 in addition to the elements 12 and 13. The reference stagnation setting circuit 33 is so arranged that it produces on a line 45 a second output signal which is equivalent to the output produced by the measuring circuit 31 when the time occupancy has reached a preset level of B percent. Then, the comparing circuit 34 compares the signal 45 from the circuit 33 and the signal from the circuit 31. If the two input signals become equal, the comparing circuit 34 produces on a line 46 a second output to be applied through the line 23 to the switching circuit 15 to cause the same to connect the third detecting element 14 to the detector 11 in addition to the elements 12 and 13, thereby further increasing the detection length of the detector to the maximum suitable for measurement of time occupancy after the stagnation has exceeded the degree of V2. The output signal 46 from the comparing circuit 34 is also applied to the compensating circuit 32 for compensation of the measured value of time occupancy in a manner similar to that previously mentioned. Without such compensation, the line L would be plotted like a dotted line L'' as the stagnation increases over V2.

On the contrary, as the stagnation decreases below V2 and then V1, the time occupancy also decreases below B percent and then A percent, so that the detecting elements 14 and 13 are successively disconnected from the detector 11 by means of the switching circuit 15. The operation will be easily understood from the previous description so that no further explanation thereof will be required.

Turning to FIG. 2, there are shown three detecting elements 112, 113 and 114 arranged in accordance with another embodiment of the invention. Here, the three loops correspond to the loops 12, 13 and 14, respectively, but have different detection lengths. The loops 112–114 are laid on the street lane 16 in such a manner that the largest loop 114 completely encloses therein the next largest loop 113, which in turn encloses therein the smallest loop 112. As will be easily seen, the smallest loop 112 is normally connected to the detector 11, while the second larger loop 113 is connected to the detector in addition to, or in place of, the detecting element 112 when the degree of stagnation has reached V1, and the largest loop 114 is connected to the detector in addition to, or in place of, the elements 112 and 113 when the degree of stagnation has exceeded V2. The arrangement of the other component circuits and the operation thereof are similar to those in FIG. 1, so that no further explanation will be given.

What I claim is:

1. An apparatus for detecting traffic information on a street, comprising: a vehicle detector having a detection area on said street and being operable in response to a vehicle in said detection area to produce a detection signal; means for substantially changing the length of said detection area in the direction in which vehicles run on said street in accordance with the traffic condition on said street; and means for providing an output signal proportional to traffic information in response to said detection signal.

2. The apparatus of claim 1, wherein said vehicle detector is provided with a plurality of detecting elements, each of said detecting elements having a respective detection area and said changing means changes the number of said detecting elements that are to be operatively connected to said detector.

3. The apparatus of claim 1, wherein said changing means is manually operable.

4. The apparatus of claim 1, wherein said changing means is automatically operable in response to the magnitude of said output signal.

5. The apparatus of claim 1, wherein said traffic condition is the degree of stagnation on said street.

6. The apparatus of claim 1, wherein said vehicle detector has a plurality of detecting elements each of said detecting elements having a respective detection area, one on which is always operatively connected to said detector while the others thereof are selectively connectable to said detector, and said detection area length changing means comprises switching means interposed between said detector and said other detecting elements to selectively connect the latter to said detector in addition to said one detecting element, thereby varying the number of detecting elements operatively connected to said detector and consequently said detection area length.

7. The apparatus of claim 6, wherein said traffic condition is the degree of traffic stagnation on said street, and further including means for producing an operating signal whenever said stagnation has reached a predetermined degree, said operating signal being applied to said switching means to operate the same.

8. The apparatus of claim 1, wherein said traffic information providing means is means for measuring the time occupancy of said detection area on said street.

9. The apparatus of claim 6, wherein said respective detection area are of substantially the same length in the direction in which vehicles run along said street and are arranged side by side in said direction on said street.

10. The apparatus of claim 6, wherein said respective detection areas are different in length in the direction in which vehicles run on said street and are arranged so that each said detection area encloses therein the next smaller one of said detection areas.

11. The apparatus of claim 1, wherein said vehicle detector is provided with a plurality of detecting elements having detection areas on said street each different from the others in length in the direction in which vehicles run on said street, and said detection area-length-changing means comprises means for selectively connecting one of said elements to said detector.

12. The apparatus of claim 1, further including means for compensating the output signal from said traffic information providing means for changes in said detection area when said detection area length has been changed.

* * * * *